Patented June 26, 1928.

1,675,035

UNITED STATES PATENT OFFICE.

ALBERT LEO, OF CHICAGO, ILLINOIS.

PECTIN PRODUCT.

No Drawing.  Application filed February 7, 1927. Serial No. 166,599.

This invention relates to a pectin product and more particularly to a dry pectin composition containing an ingredient therein capable of acting as a dispersive agent for rendering the dry pectin water soluble.

As is well known, liquid pectin, or pectin solutions, have been available for some time for use in jelly making and the like. Dry pectin compositions containing sugar and acid are also known in the art. There are, however, purposes for which pectin may be used where such sugar containing compositions are partially or totally unsuited.

It is therefore an object of this invention to provide a pectin product containing an ingredient other than sugar as the active dispersive agent in order that dry pectin may be utilized in the manufacture of products other than those of which sugar is a normal ingredient.

It is a further object of this invention to provide a cheap ingredient suitable for use as a dispersive agent in effecting rapid solution of dry pectin.

Other and further important objects of this invention will be apparent from the disclosures in the specification and the appended claims.

I have found that pectin may be advantageously used in the manufacture of many products other than the jams and jellies, the manufacture of which now forms the chief outlet of pectin products. Among such new uses for pectin may be mentioned milk products, such as cheese in its various forms. In the manufacture of cheese for instance, a dry pectin composition containing sugar would be totally unsuited for obvious reasons. Ordinarily, the pectin compositions marketed in dry form contain as much as two to four times as much sugar as pectin, in order that the pectin may be caused to go into solution rapidly and also to prevent the pectin from deteriorating in the presence of the acids that are usually found in such compositions. Such large quantities of sugar are, of course, out of the question in the manufacture of cheeses.

In the place of sugar as a dispersive agent I therefore propose to use any cheap mineral salt of a harmless nature that is readily soluble in water. The salt that I prefer to use is common salt, chemically known as sodium chloride, either in its pure form or containing small quantities of the alkaline earth chlorides, such as magnesium and calcium. Such salts, being readily soluble and highly ionized, tend to break down and disperse the colloidal coating that normally forms on pectin particles when placed in water, thereby effecting a very rapid and thorough solution of the pectin. The dispersive action of salt is in fact much more efficient than sugar, probably owing to the fact that salt is highly ionized whereas sugar being an organic compound, remains unionized in solution.

In manufacture of cheese and the like, the presence of salt in pectin products used in connection with the making of the cheese is advantageous rather than the reverse. Furthermore, in cheese making processes considerable quantities of organic acids, such as lactic acid, are developed so that it is unnecessary to include in the pectin composition an acid as is the case of pectin compositions used in jelly making. Where my pectin product is to be used in processes requiring the addition of an acid, however, the acid may be mixed with the dry pectin-salt composition, or may be added separately.

The proportion of salt to pectin in my pectin composition may be varied greatly, depending upon the use to which the composition is to be put. At least equal weights of pectin and salt are nesessary to effect rapid solution of the dry pectin, but a large excess of salt over pectin has no detrimental effect upon the dispersive qualities of the salt present and may be used except where undesirable for other reasons. The pectin is preferably finely ground and intimately mixed with the salt in the proportions desired. The salt, of course, acts beneficially in preventing deterioration of the pectin.

The salt may also obviously perform the function of a standardizing medium, being added in such proportions to the pectin as to produce a resultant pectin product of desired effective strength, at the same time effecting the desired dispersing referred to herein.

I am aware that many changes may be made, and numerous details of the process may be varied through a wide range without departing from the principles of this invention, and I therefore do not purpose limiting the patent granted hereon, otherwise than necessitated by the prior art.

I claim as my invention:

1. A dry pectin composition containing a metallic halide as the active dispersive agent and adapted upon the addition of water to go rapidly into solution.

2. In a process of making pectin solutions from dry pectin, the step of adding to said pectin a mineral salt adapted to serve as a dispersive agent to aid in the dissolving of the pectin.

3. A dry pectin composition, consisting of pectin and common salt, the salt serving both as a dispersive agent in rendering the dry pectin more soluble and also as a standardizing medium for the pectin.

In testimony whereof I have hereunto subscribed my name at Chicago, Cook County, Illinois.

ALBERT LEO.